(12) United States Patent
Steurrys et al.

(10) Patent No.: US 10,564,313 B2
(45) Date of Patent: Feb. 18, 2020

(54) METHOD AND DEVICE FOR PROTECTING PRINTHEADS IN THREE-DIMENSIONAL OBJECT PRINTERS

(71) Applicant: Xerox Corporation, Norwalk, CT (US)

(72) Inventors: Christine A. Steurrys, Williamson, NY (US); Robert E. Rosdahl, Jr., Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 14/956,957

(22) Filed: Dec. 2, 2015

(65) Prior Publication Data

US 2017/0157854 A1 Jun. 8, 2017

(51) Int. Cl.
| | |
|---|---|
| *G01V 8/12* | (2006.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC ............ *G01V 8/12* (2013.01); *B33Y 10/00* (2014.12); *B33Y 30/00* (2014.12); *B33Y 40/00* (2014.12); *B33Y 50/02* (2014.12)

(58) Field of Classification Search
CPC ....................................................... G01V 8/12
See application file for complete search history.

(56) References Cited

U.S. PATENT DOCUMENTS

| | | | |
|---|---|---|---|
| 4,350,986 A * | 9/1982 | Yamada | .................. B41J 2/115 346/3 |
| 8,573,733 B2 | 11/2013 | Mandel et al. | |
| 8,746,694 B2 | 6/2014 | Moore et al. | |
| 2013/0300794 A1 | 11/2013 | Leighton et al. | |

* cited by examiner

*Primary Examiner* — Larry W Thrower
(74) *Attorney, Agent, or Firm* — Maginot Moore & Beck LLP (57) ABSTRACT

A printer protects at least one ejector, which is configured to form an object, from contact with the object. The printer includes the at least one ejector, a member, and a protection device. The protection device includes a shield configured to be moved between a stored position at which the shield is not interposed between the at least one ejector and the object, and a deployed position at which the shield is interposed between the at least one ejector and the object. The shield can be moved from the stored position toward the deployed position in response to contact between a projection of the protection device and the object.

8 Claims, 13 Drawing Sheets

METHOD AND DEVICE FOR PROTECTING PRINTHEADS IN THREE-DIMENSIONAL OBJECT PRINTERS

TECHNICAL FIELD

The device disclosed in this document relates to printers that produce three-dimensional objects and, more particularly, to protecting printheads of such printers.

BACKGROUND

Digital three-dimensional manufacturing, also known as digital additive manufacturing, is a process of making a three-dimensional solid object of virtually any shape from a digital data model. Polyjet three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Figure 5A:
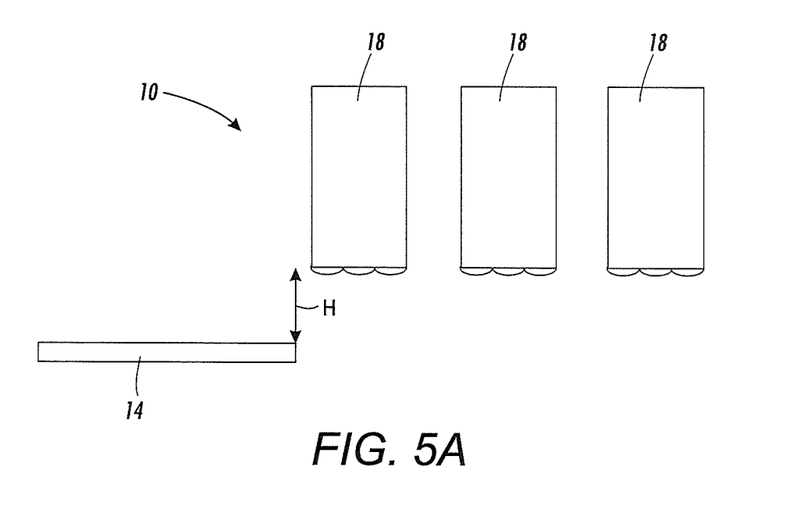
FIG. 5A shows a side view of a prior art three-dimensional object printer prior to performing a first portion of a process to form an object.

One process for producing three-dimensional objects with a three-dimensional printing system 10 is illustrated in FIGS. 5A-5D. As shown in FIG. 5A, at the beginning of a printing operation, a member 14 and at least one printhead 18 are positioned such that the at least one printhead 18 is spaced vertically above the member 14 by the height H, and the member 14 is to the left of the at least one printhead 18.

Figure 5B:
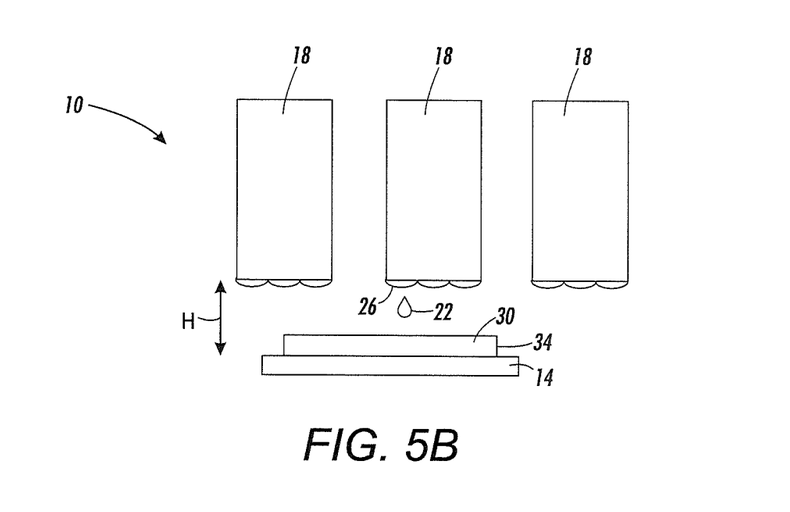
FIG. 5B shows a side view of the prior art three-dimensional object printer of FIG. 5A after a first portion of the process has been completed.

As shown in FIG. 5B, as the member 14 and the at least one printhead 18 then move relative to one another, the member 14 moves toward the right relative to the at least one printhead 18. As the member 14 passes underneath the at least one printhead 18, material 22 is ejected from at least one ejector 26 of the at least one printhead 18 toward various locations of the member 14 to form a first layer 30 of an object 34.

Figure 5C:
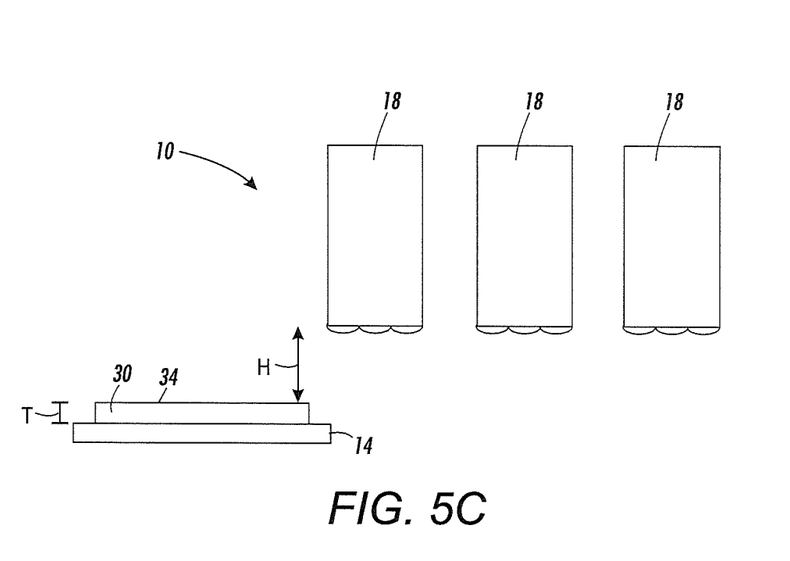
FIG. 5C shows a side view of the prior art three-dimensional object printer of FIG. 5A after a second portion of the process has been completed.

Next, as shown in FIG. 5C, when the first layer 30 of the object 34 has been completed, the at least one printhead 18 and the member 14 are moved relative to one another such that the at least one printhead 18 is spaced above the first layer 30 by the height H. In other words, the at least one printhead 18 and the member 14 are moved vertically apart from one another to accommodate a thickness T of the object 34 atop the member 14. Additionally, the member 14 is again positioned to the left of the at least one printhead 18.

Figure 5D:
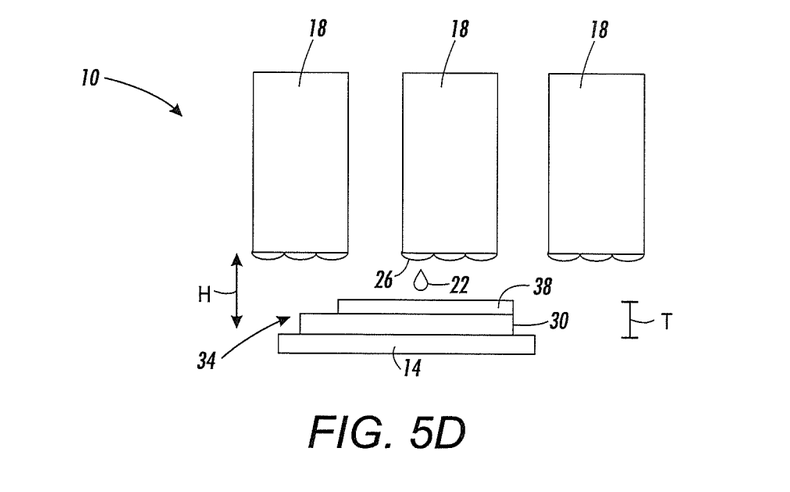
FIG. 5D shows a side view of the prior art three-dimensional object printer of FIG. 5A after a third portion of the process has been completed.

As shown in FIG. 5D, as the member 14 and the at least one printhead 18 then move relative to one another, the member 14 again moves toward the right relative to the at least one printhead 18 in the same manner as described above. As the member 14 passes underneath the at least one printhead 18, the material 22 is ejected from the at least one ejector 26 of the at least one printhead 18 toward various locations of the member 14 to form a second layer 38 of the object 34 atop the first layer 30. Accordingly, the thickness T of the object 34 is increased by the material 22 of the second layer 38. This process can be repeated as many times as necessary to form the object 34.

This three-dimensional object printing process is an additive process, and material 22 is repeatedly added to the object 34 such that the thickness T of the object 34 increases throughout the process. Accordingly, to accommodate the increasing thickness T of the object 34, the height H of the printhead 18 relative to the member 14 is also increased after each layer is added to the object 34 and before another layer is added. In other words, the printhead 18 and the member 14 are moved vertically apart from one another after each layer is added to the object 34.

One issue that arises in the production of three-dimensional objects with a three-dimensional object printer in the manner described above is the possibility that the vertical position of the printhead 18 will not be properly adjusted relative to the member 14 to accommodate the increasing thickness T of the object 34 before the member 14 moves to the right relative to the at least one printhead 18. In this case, the object 34 may contact the at least one printhead 18 and the at least one ejector 26 on the at least one printhead 18, causing damage to the at least one printhead 18. Replacing or repairing a printhead is time-consuming and expensive. Accordingly, a three-dimensional object printer capable of protecting at least one ejector in a printhead from contact with an object or member would be advantageous because such a three-dimensional object printer would reduce expenditures of time and money to repair the printer.

SUMMARY

A three-dimensional object printer that protects a printhead from contact with an object being formed or the member on which the object rests during the printing process includes a member having a planar surface, at least one ejector configured to eject material toward the planar surface of the member to form an object on the member, and a shield configured to move to be selectively interposed between the object and the at least one ejector to prevent contact between the object and the at least one ejector. The shield is configured to move between a first position, at which the shield is not interposed between the object and the at least one ejector, and a second position, at which the shield is interposed between the object and the at least one ejector.

A protection device that protects a printhead of a three-dimensional object printer from contact with an object being formed or the member on which the object is being formed during the printing process includes a shield and a projection. The shield is configured to move between a first position, at which the shield is not interposed between the object and the at least one ejector, and a second position, at which the shield is interposed between the object and the at least one ejector. The projection is coupled to the shield and is arranged to project toward the object. The projection is configured to move the shield from the first position toward the second position in response to the projection engaging the object.

A method of protecting a printhead from contact with an object being formed or the member on which the object is being formed during the printing process includes moving a shield between a first position, at which the shield is not interposed between the at least one ejector and the object, and a second position, at which the shield is interposed between the at least one ejector and the object.

BRIEF DESCRIPTION OF THE DRAWINGS

The foregoing aspects and other features of an apparatus and method that can protect at least one printhead of a three-dimensional object printer from contact with the object being formed or the member on which the object is being formed during the printing process are explained in the following description, taken in connection with the accompanying drawings.

DETAILED DESCRIPTION

For a general understanding of the environment for the device and method disclosed herein as well as the details for the apparatus and method, reference is made to the drawings. In the drawings, like reference numerals designate like elements.

Figure 1:
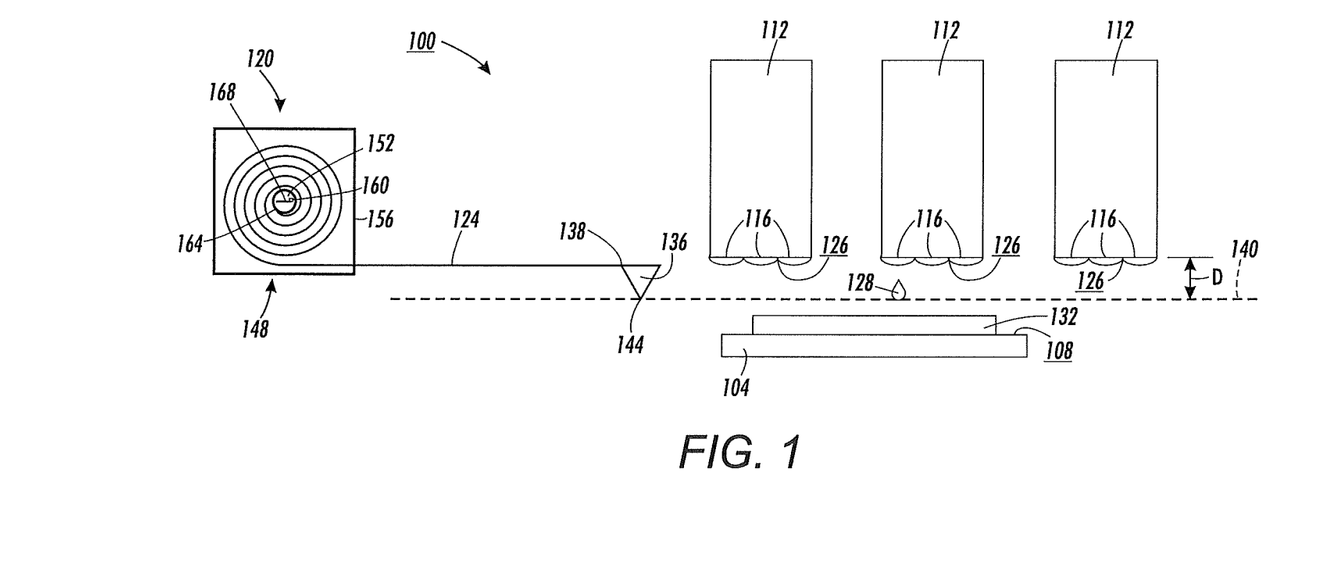
FIG. 1 shows a printing system including a shield in a stored position.
Figure 2:
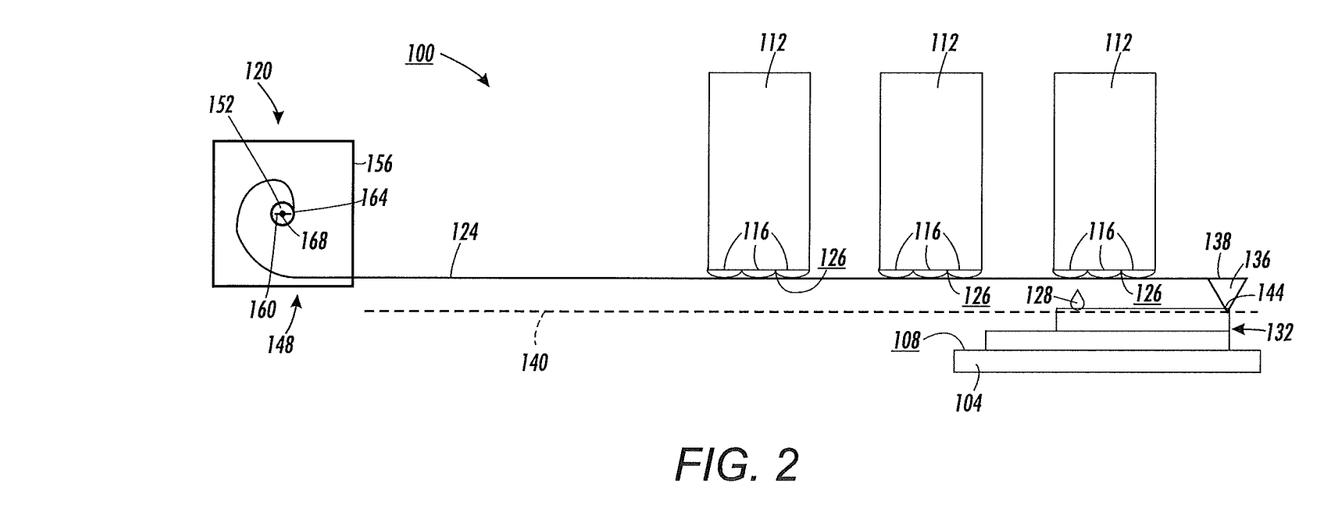
FIG. 2 shows the printing system of FIG. 1 with the shield in a deployed position.

A three-dimensional object printing system, or printer, 100 is shown in FIG. 1 and FIG. 2. The printing system 100 is similar to the printing system 10 of the prior art, described above and shown in FIGS. 5A-5D Like the prior art printing system 10, the printing system 100 includes a substrate or a member 104, having a planar surface 108, and at least one printhead 112 including at least one nozzle or ejector 116. The at least one ejector 116 is arranged on a bottom face 126 of the at least one printhead 112 facing toward the member 104. The printing system 100 is configured to eject material 128 from the at least one printhead 112, through the at least one ejector 116, onto the planar surface 108 of the member 104 to form an object 132. Accordingly, to receive the material 128, the member 104 is positioned at a location beneath the at least one printhead 112.

The printing system 100 differs from the prior art printing system 10, however, in that the printing system 100 also includes a protection device 120 having a movable shield 124. As described in more detail below, the shield 124 of the protection device 120 is configured to be moved between a stored position, shown in FIG. 1, at which the shield 124 is not interposed between the at least one ejector 116 and the object 132, and a deployed position, shown in FIG. 2, at which the shield 124 is interposed between the at least one ejector 116 and the object 132.

The protection device 120 further includes a projection 136 on a leading edge 138 of the shield 124. In one embodiment, the projection 136 can be integrally formed with the leading edge 138 of the shield 124. In another embodiment, the projection 136 can be affixed to the leading edge 138 of the shield 124. The projection 136 is arranged so as to project downwardly from the shield 124 toward the member 104 and the object 132.

The printing system 100 includes a protection plane 140, which is substantially parallel to the planar surface 108 of the member 104. The protection plane 140 is defined at a distance D beneath the at least one printhead 112 such that the protection plane 140 is beneath the at least one ejector 116 of the at least one printhead 112 and above the location where the material 128 ejected from the at least one printhead 112 is received on the planar surface 108 of the member 104. The projection 136 includes a lowermost point 144 that is aligned with the protection plane 140. Accordingly, the lowermost point 144 of the projection 136 is arranged in the protection plane 140, between the at least one ejector 116 and the planar surface 108 of the member 104.

The protection device 120 further includes a storage device 148 configured to store the shield 124 when the shield 124 is in the stored position. The storage device 148 includes a shaft 152, a housing 156, and a winding mechanism 160. The shaft 152 is coupled to a trailing edge 164 of the shield 124. The trailing edge 164 is opposite the leading edge 138 of the shield 124. The shaft 152 can be integrally formed with the trailing edge 164 of the shield 124, permanently affixed to the trailing edge 164 of the shield 124, or otherwise coupled to the trailing edge 164 of the shield 124. The shaft 152 is configured to rotate about a rotation axis 168 to wind the shield 124 onto the shaft 152 or unwind the shield 124 from the shaft 152. Winding the shield 124 around the shaft 152 moves the shield 124 toward the stored position (shown in FIG. 1). Conversely, unwinding the shield 124 from the shaft 152 moves the shield 124 toward the deployed position (shown in FIG. 2). The shaft 152 is fixedly positioned within the housing 156 such that when the shield 124 is wound onto the shaft 152, the shield 124 is received within the housing 156.

In the embodiment shown, when the shield 124 is received within the housing 156, the projection 136 remains outside the housing 156. In an alternative embodiment, however, when the shield 124 is received within the housing 156, the projection 136 is also received within the housing 156.

The winding mechanism 160 is operatively connected to the shaft 152 to wind the shield 124 onto the shaft 152 to move the shield 124 from the deployed position toward the stored position. In one embodiment, the winding mechanism 160 can be a screw head configured to be engaged by a mating screw driver (not shown) to rotate the shaft 152. In another embodiment, the winding mechanism 160 can be a crank configured to be rotated to rotate the shaft 152. In yet another embodiment, the winding mechanism 160 can be a torsion spring configured to bias the shaft 152 to rotate in a direction to wind the shield 124 onto the shaft 152. Regardless of the form, the winding mechanism 160 is configured to rotate the shaft 152 about the rotation axis 168 to wind the shield 124 onto the shaft 152.

In the present embodiment, the shield 124 is made of a flexible material to enable the shield 124 to be wound onto and off of the shaft 152 and into and out of the housing 156. In other embodiments, however, the shield 124 can be made of a rigid material. In embodiments in which the shield 124 is made of a rigid material, the storage device 148 includes elements besides the shaft 152, the housing 156, and the winding mechanism 160 to enable storage of the rigid shield 124 in the stored position.

In a similar manner as that described above with respect to the prior art printing system 10 and shown in FIGS. 5A-5D, the member 104 and the at least one printhead 112 move relative to one another during a printing operation so the material 128 is ejected from the at least one printhead 112 toward various locations of the member 104 to form the object 132. In the embodiment shown, the member 104 is moved and the at least one printhead 112 remains stationary. However, in at least one alternative embodiment, the at least one printhead 112 is moved and the member 104 remains stationary. In at least one additional alternative embodiment, the at least one printhead 112 and the member 104 both move.

Figure 3A:
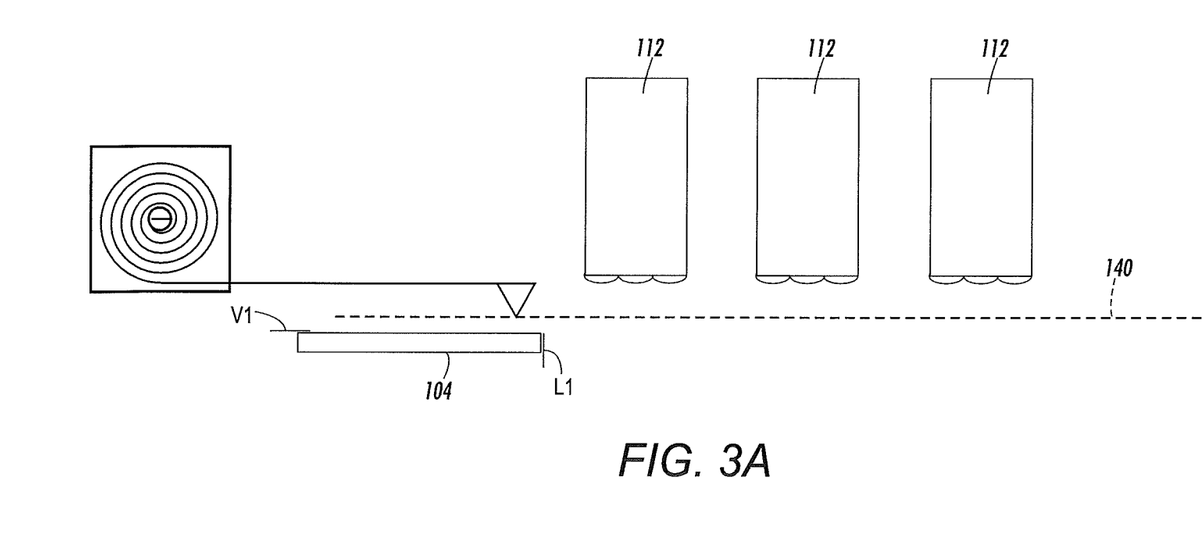
FIG. 3A shows a side view of the printing system of FIG. 1, prior to performing a first portion of a process to form an object.
Figure 3B:
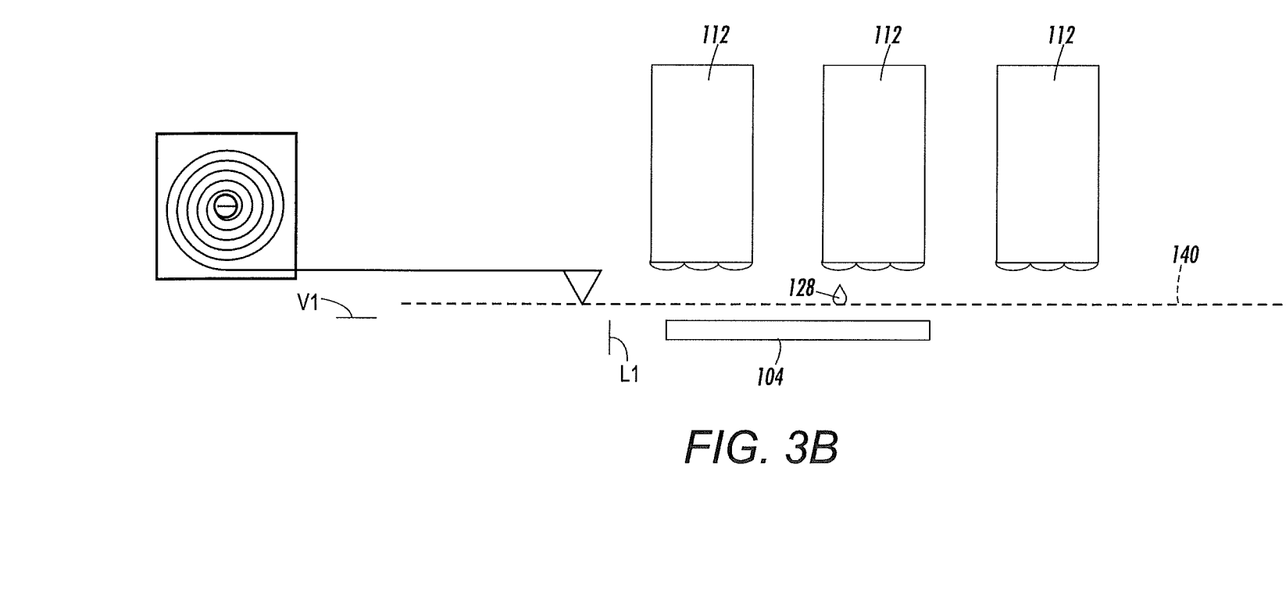
FIG. 3B shows a side view of the printing system of FIG. 3A after a first portion of the process has been completed.

As shown in FIG. 3A, at the beginning of a printing operation, the member 104 is positioned at a vertical position V1 and a lateral position L1 relative to the at least one printhead 112. The vertical position V1 is selected such that the member 104 is positioned below the protection plane 140 of the protection device 120. The lateral position L1 is selected to enable the entire member 104 to pass beneath the entire at least one printhead 112 such that the at least one printhead 112 can eject material 128 (shown in FIG. 3B) toward every location of the member 104. In the embodiment shown, the lateral position L1 of the member 104 relative to the at least one printhead 112 is to the left of the entire at least one printhead 112. In alternative embodiments, however, the lateral position L1 of the member 104 relative to the at least one printhead 112 in the starting position can be to the right of the entire at least one printhead 112, in front of the entire at least one printhead 112, or behind the entire at least one printhead 112. As shown in FIG. 3B, as the member 104 moves away from the lateral position L1 and passes beneath the at least one printhead 112, and material 128 is ejected toward the member 104, the vertical position V1 of the member 104 relative to the at least one printhead 112 is maintained.

Figure 3C:
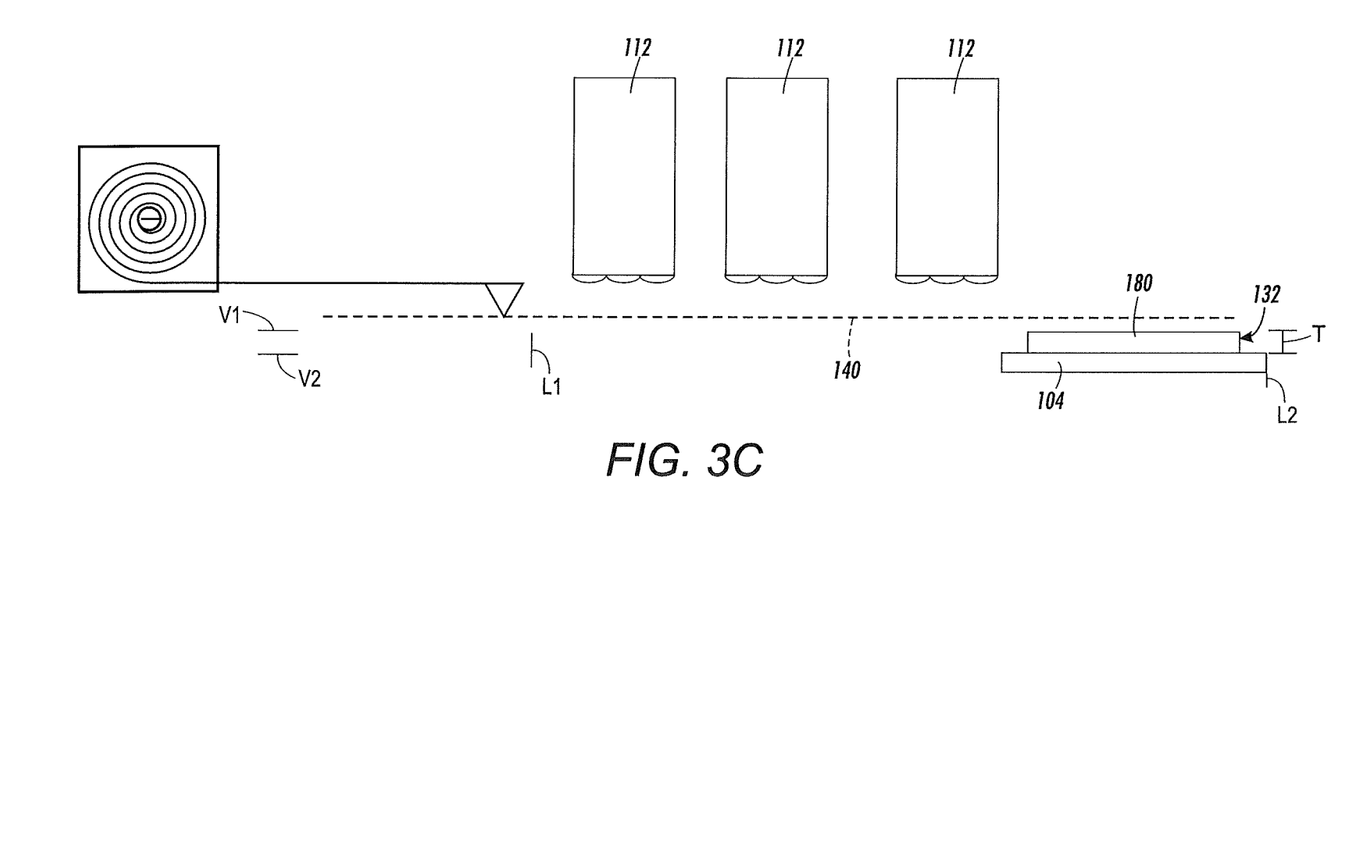
FIG. 3C shows a side view of the printing system of FIG. 3A after a second portion of the process has been completed.

As shown in FIG. 3C, after the entire member 104 has passed beneath the at least one printhead 112, the member 104 is positioned in a lateral position L2 relative to the at least one printhead 112. The lateral position L2 of the member 104 relative to the at least one printhead 112 is such that the entire member 104 has passed beneath the entire at least one printhead 112. In other words, the lateral position L2 of the member 104 relative to the at least one printhead 112 is to the right of the entire at least one printhead 112. As shown in FIG. 3C, a first layer 180 of the object 132 is formed on the member 104 by the material 128 (shown in FIG. 3B) ejected from the at least one printhead 112.

If another layer of material 128 is to be added to the object 132, the member 104 is again positioned such that the member 104 is at the lateral position L1 relative to the at least one printhead 112. However, as shown in FIG. 3C, the first layer 180 of the object 132 has a thickness T. Thus, the object 132 is closer to the protection plane 140 than the member 104 by the thickness T. Accordingly, before returning the member 104 to the lateral position L1, the vertical position V1 of the member 104 relative to the at least one printhead 112 is adjusted to vertical position V2 to prevent the object 132 from contacting the at least one printhead 112 as the member 104 is returned to the lateral position L1. The vertical position V2 is farther from the at least one printhead 112 than the vertical position V1.

Figure 3D:
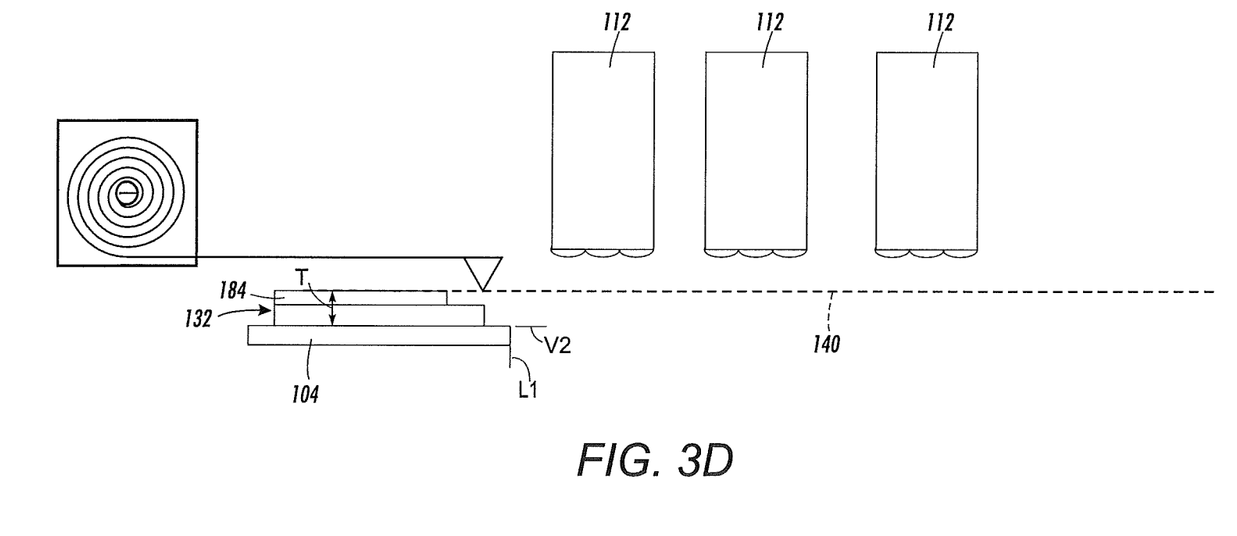
FIG. 3D shows a side view of the printing system of FIG. 3A with the shield in the stored position.

As shown in FIG. 3D, each new layer of material added to the object 132 is printed atop the previous layer. Accordingly, each new layer of the object 132 forms at least a portion of an uppermost layer 184 of the object 132 and defines a new thickness T of the object 132 which is greater than the previous thickness T of the object 132. As shown in FIG. 3D, if the vertical position V2 of the member 104 relative to the at least one printhead 112 is not properly adjusted to accommodate the new thickness T of the object 132, at least a portion of the object 132 can be positioned above the projection plane 140.

Figure 3E:
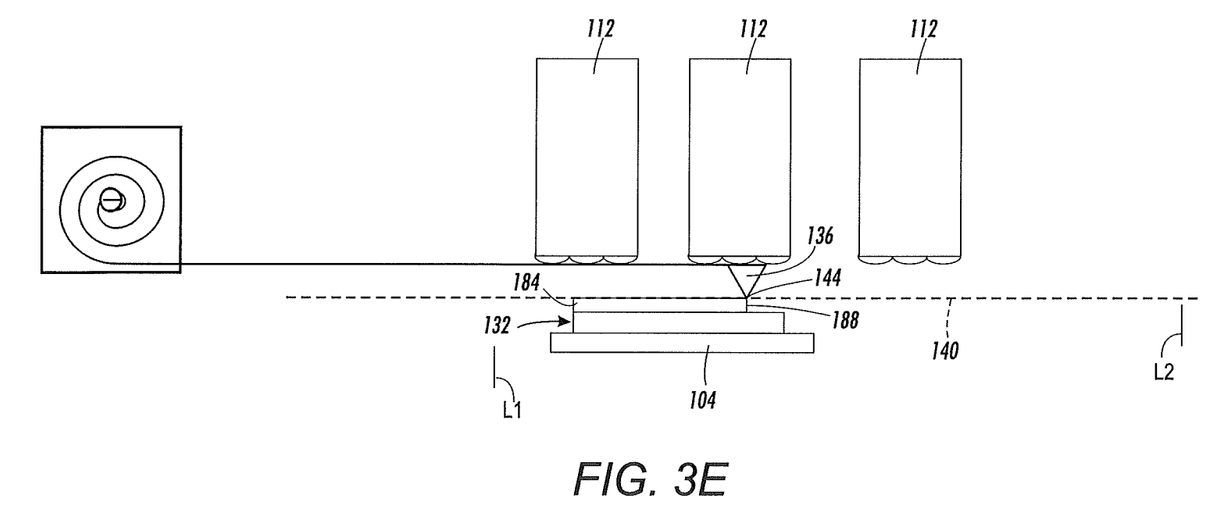
FIG. 3E shows a side view of the printing system of FIG. 3A with the shield in a partially deployed position.

As shown in FIG. 3E, the projection 136 is configured to engage with the object 132 when any portion of the object 132 is positioned above the protection plane 140 and the member 104 passes beneath the at least one printhead 112. The projection 136 engages with the object 132 by contacting an uppermost leading edge 188 of the uppermost layer 184 of the object 132 and being pulled by the object 132 as the member 104 moves from the lateral position L1 toward the lateral position L2. In the embodiment shown, the projection 136 is substantially shaped as a prism or a cone such that the lowermost point 144 of the projection 136 is configured to contact the uppermost leading edge 188 of the object 132. In alternative embodiments, however, the projection 136 can have other shapes which enable the lowermost point 144 of the projection 136 to contact the uppermost leading edge 188 of the object 132 and enable the projection 136 to be pulled by the object 132.

Figure 3F:
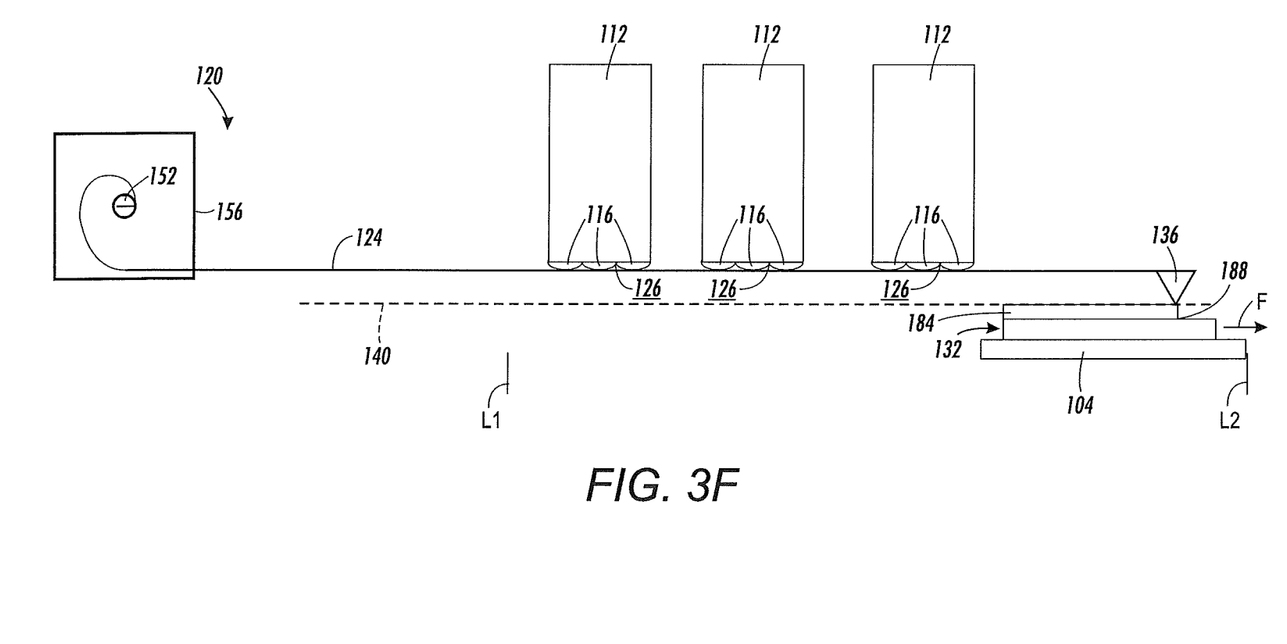
FIG. 3F shows a side view of the printing system of FIG. 3A with the shield in the deployed position.

As shown in FIG. 3F, the protection device 120 is configured such that as the projection 136 is pulled by the object 132 as the member 104 moves from the lateral position L1 toward the lateral position L2, the shield 124 is unwound from the shaft 152 and removed from the housing 156 to cover the at least one ejector 116 on the bottom face 126 of the at least one printhead 112. In other words, the force F that the member 104 exerts on the projection 136 via the object 132 is sufficient to rotate the shaft 152 and unwind the shield 124 from the shaft 152. When the shield 124 is unwound from the shaft 152 by the engagement of the projection 136 with the object 132, as shown in FIG. 3F, the shield 124 is interposed between the object 132 and the at least one ejector 116 of the at least one printhead 112, and the shield 124 in the deployed position.

Because the projection 136 engages with the uppermost layer 184 of the object 132 via the uppermost leading edge 188, the projection 136 engages with the portion of the object 132 which is arranged closest to the at least one printhead 112. This arrangement enables the shield 124 to prevent any portion of the object 132 from contacting the at least one printhead 112 and the at least one ejector 116. By preventing damage to the at least one ejector 116 via contact with the object 132, the shield 124 reduces expenditures of time and money to repair the printing system 100. Additionally, the protection device 120 is configured to prevent contact between the member 104 and the at least one printhead 112 in the same manner. More specifically, if the member 104 is not properly vertically positioned relative to the at least one printhead 112, the projection 136 can engage with the member 104 to deploy the shield 124 to prevent the member 104 from contacting the at least one printhead 112 and the at least one ejector 116.

After the shield 124 has been deployed, the shield 124 is wound back onto the shaft 152 and into the stored position (shown in FIG. 1) by the winding mechanism 160. When the shield 124 is wound onto the shaft 152, the shield 124 is no longer interposed between the at least one ejector 116 and the member 104 or the object 132. Once the shield 124 is wound back onto the shaft 152 into the stored position, the printing system 100 can initiate a new printing operation.

Figure 4A:
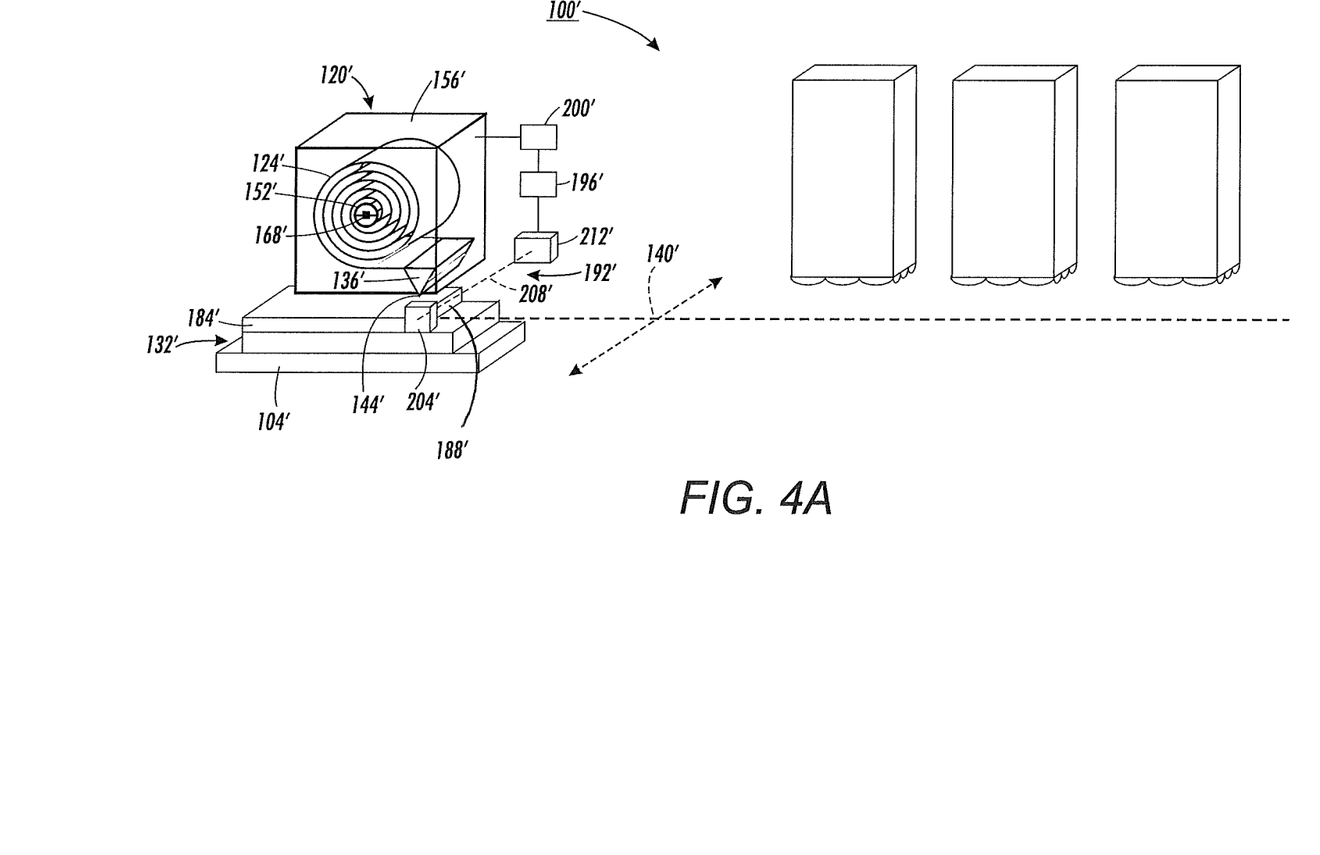
FIG. 4A shows a side view of a printing system including a shield prior to the shield being positioned to be deployed.
Figure 4B:
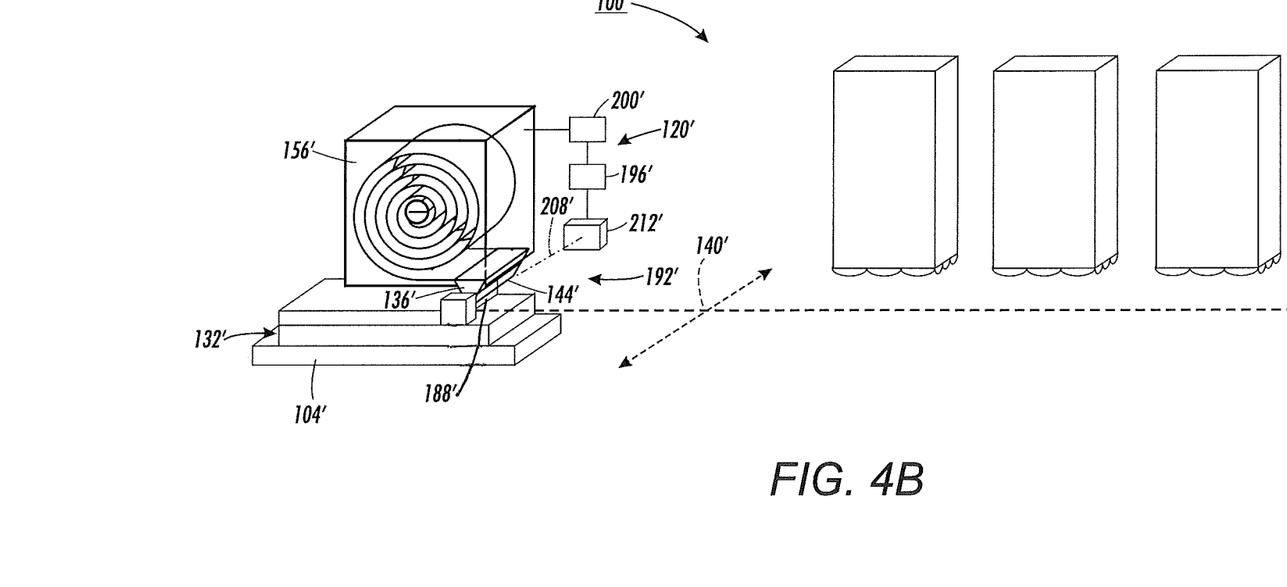
FIG. 4B shows a side view of the printing system of FIG. 4A after the shield has been positioned to be deployed.
Figure 4C:
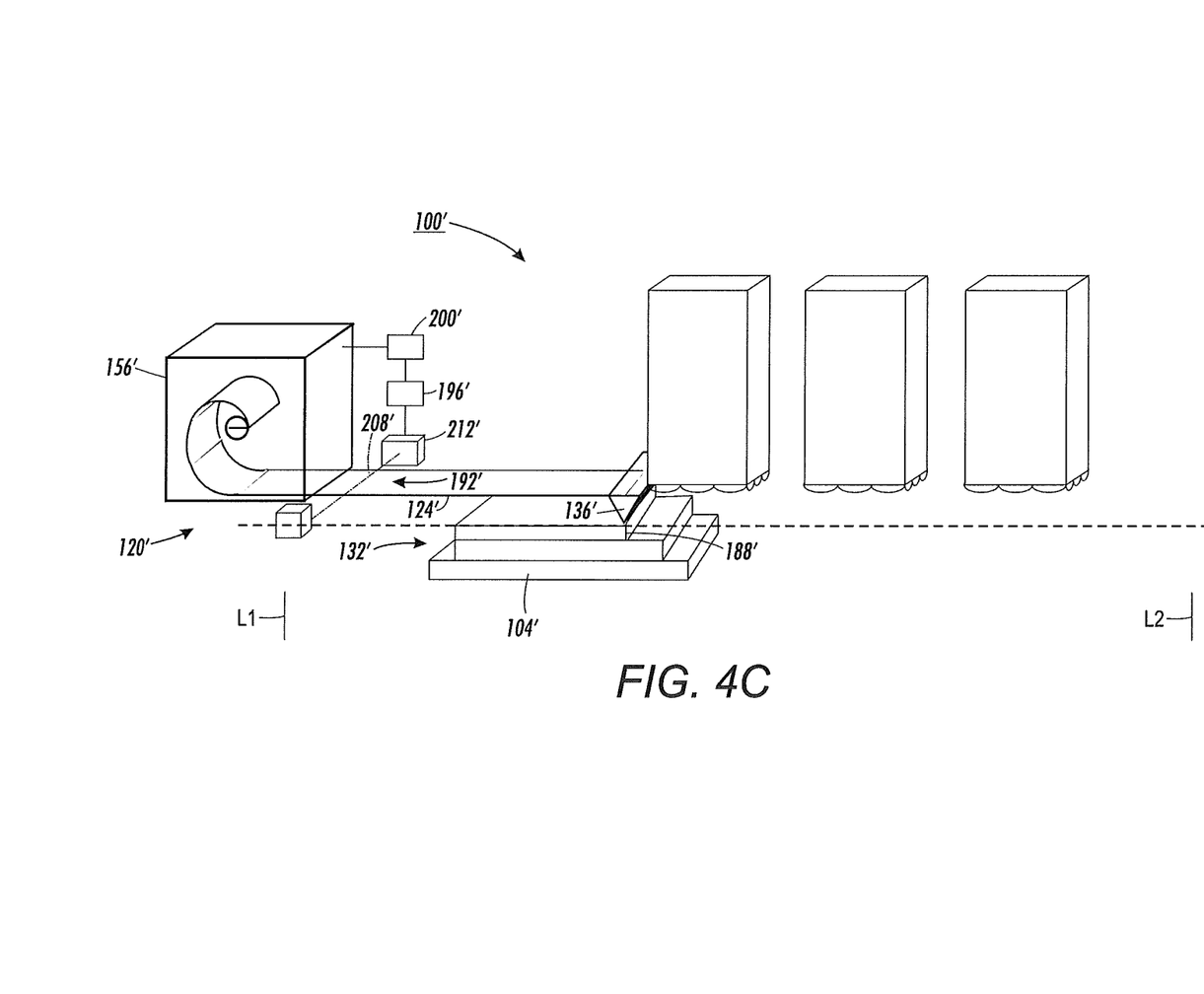
FIG. 4C shows a side view of the printing system of FIG. 4A with the shield in a partially deployed position.

An alternative embodiment of a printing system 100' including a protection device 120' is shown in FIGS. 4A-4C. The printing system 100' and the protection device 120' are substantially similar to the printing system 100 and protection device 120 described above. Accordingly, similar structures are assigned similar reference numerals and description of the structure and function which is the same is not repeated. The protection device 120' differs from the protection device 120, however, in that the protection device 120' further includes a sensor 192', a controller 196', and an actuator 200'. In the embodiment shown, the sensor 192' includes an emitter 204' configured to emit an infrared beam 208' and a receiver 212' configured to receive the infrared beam 208'. The emitter 204' and receiver 212' are arranged such that the infrared beam 208' is emitted in the protection plane 140' and in a direction parallel to the rotation axis 168' of the shaft 152'.

In this embodiment, the projection 136' is arranged within the housing 156' of the storage device 148' when the shield 124' is in the stored position. As shown in FIG. 4B, when a portion of the object 132' interrupts the infrared beam 208' (shown in FIG. 4A) such that the receiver 212' does not receive the infrared beam 208', the projection 136' is released from the housing 156' so the lowermost point 144' of the projection 136' is aligned with the protection plane 140'. Accordingly, the sensor 192' is configured to sense the presence of the uppermost leading edge 188' of the object 132'.

The controller 196' is operatively connected to the sensor 192' and is configured to receive an electronic signal from the sensor 192' when the sensor 192' senses the presence of the uppermost leading edge 188' of the object 132'. The actuator 200' is operatively connected to the controller 196' and to the protection device 120'. The actuator 200' is configured to receive an electronic signal from the controller 196' to release the projection 136' from the housing 156' when the sensor 192' senses the presence of the uppermost leading edge 188' of the object 132'.

As shown in FIG. 4C, once released from the housing 156', the projection 136' contacts the uppermost leading edge 188' of the object 132' as the member 104' moves from the lateral position L1 toward the lateral position L2 to deploy the shield 124' from the stored position to the deployed position. In alternative embodiments, the sensor 192' can include components other than an emitter 204' and receiver 212' and can be configured to sense the presence of the uppermost leading edge 188' of the object 132' other than by infrared beam 208'.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer comprising:
   a member having a planar surface;
   at least one ejector configured to eject material toward the planar surface of the member to form an object on the member; and
   a shield configured to move to be selectively interposed between the object and the at least one ejector to prevent contact between the object and the at least one ejector, the shield configured to move between a first position at which the shield is not interposed between the object and the at least one ejector, and a second position at which the shield is interposed between the object and the at least one ejector.

2. The printer of claim 1, the shield further comprising:
   a projection arranged to project toward the object, the projection being aligned with a protection plane that is substantially parallel to the planar surface of the member and arranged between the planar surface of the member and the at least one ejector.

3. The printer of claim 2, the shield being further configured to:
   move from the first position toward the second position in response to the object crossing the protection plane.

4. The printer of claim 2, the shield being further configured to:
   move from the first position toward the second position in response to the projection engaging the object.

5. The printer of claim 1 wherein the shield consists essentially of a flexible material.

6. The printer of claim 1 further comprising:
   a shaft about which the shield is wound about when the shield is in the first position.

7. The printer of claim 2 wherein the shield is substantially flat and parallel to the protection plane in the second position.

8. The printer of claim 2 further comprising:
   a sensor configured to detect the object;
   a controller operatively connected to the sensor and configured to receive a signal from the sensor that indicates the object has been detected; and
   an actuator operatively connected to the controller and to the shield, the actuator configured to receive a signal from the controller to move the projection toward the object to enable the projection to contact the object in response to the controller receiving the signal indicative of the object being detected.

* * * * *